(12) United States Patent
Saint-Michel

(10) Patent No.: US 11,962,187 B2
(45) Date of Patent: Apr. 16, 2024

(54) STATOR FOR A ROTATING ELECTRICAL MACHINE

(71) Applicant: Moteurs Leroy-Somer, Angouleme (FR)

(72) Inventor: Jacques Saint-Michel, Angouleme (FR)

(73) Assignee: Moteurs Leroy-Somer, Angouleme (FR)

( * ) Notice: Subject to any disclaimer, the term of this patent is extended or adjusted under 35 U.S.C. 154(b) by 742 days.

(21) Appl. No.: 17/058,546

(22) PCT Filed: Jun. 4, 2019

(86) PCT No.: PCT/EP2019/064503
§ 371 (c)(1),
(2) Date: Nov. 24, 2020

(87) PCT Pub. No.: WO2019/234030
PCT Pub. Date: Dec. 12, 2019

(65) Prior Publication Data
US 2021/0126496 A1   Apr. 29, 2021

(30) Foreign Application Priority Data
Jun. 7, 2018   (FR) ...................................... 1854963

(51) Int. Cl.
*H02K 1/16* (2006.01)
*H02K 3/12* (2006.01)
*H02K 3/28* (2006.01)
*H02K 15/02* (2006.01)
*H02K 15/06* (2006.01)

(52) U.S. Cl.
CPC ............... *H02K 1/165* (2013.01); *H02K 3/12* (2013.01); *H02K 3/28* (2013.01); *H02K 15/024* (2013.01); *H02K 15/067* (2013.01)

(58) Field of Classification Search
CPC .............. H02K 1/16; H02K 1/165; H02K 3/12
See application file for complete search history.

(56) References Cited

U.S. PATENT DOCUMENTS

| 2003/0201687 | A1* | 10/2003 | Asai ........................ H02K 3/493 |
| | | | 310/216.069 |
| 2007/0075604 | A1* | 4/2007 | Hsu ........................ H02K 15/066 |
| | | | 310/216.023 |
| 2017/0033620 | A1* | 2/2017 | Saint-Michel ....... H02K 15/066 |
| 2017/0077791 | A1 | 3/2017 | Li et al. |

FOREIGN PATENT DOCUMENTS

| FR | 3019947 A1 | 10/2015 |
| FR | 3019949 A1 | 10/2015 |
| JP | H02 211027 A | 8/1990 |
| JP | 2007295763 A | 11/2007 |

OTHER PUBLICATIONS

International Search Report (ISR) for PCT/EP2019/064503 dated Jul. 24, 2019 (6pages).

* cited by examiner

*Primary Examiner* — Gary A Nash
(74) *Attorney, Agent, or Firm* — Shumaker, Loop & Kendrick, LLP

(57) ABSTRACT

A stator for a rotary electric machine, having a stator mass that has slots in which electrical conductors introduced axially into the slots are housed, each of the slots having a continuously closed contour.

14 Claims, 4 Drawing Sheets

US 11,962,187 B2

STATOR FOR A ROTATING ELECTRICAL MACHINE

TECHNICAL FIELD AND BACKGROUND

The present invention relates to rotary electric machines, and more particularly to the stators of such machines.

In the known stators, the yoke forms slots that are fully open or semi-open in the direction of the air gap, so as to allow windings to be introduced. In general, the semi-open slots receive electrical conductors with a circular transverse section that are disposed loosely, while the fully-open slots house electrical conductors with a rectangular transverse section that are disposed in an arranged manner.

Stators are known in which the slots may be closed by non-magnetic wedges. However, such wedges risk becoming detached and impeding the operation of the machine.

Patent application FR 3 019 947 describes a stator having a toothed ring having teeth that are connected to one another by bridges of material and define between one another slots for receiving the coils, the slots being open radially toward the outside. The openings of the slots are closed by a yoke attached to the toothed ring.

SUMMARY

There is a need to benefit from a stator for a rotary electric machine that is easy to assemble and allows efficient filling of the slots, while ensuring satisfactory electromagnetic performance. There is also a need to further improve stators for electric machines and in particular to reduce the torque ripple.

Stator

The invention aims to meet this need and achieves this, according to one of its aspects, by virtue of a stator for a rotary electric machine, having a stator mass that has slots in which electrical conductors introduced axially into the slots are housed, each of the slots having a continuously closed contour.

"Continuously closed" is understood to mean that the slots have a continuous closed contour when they are viewed in transverse section, taken perpendicular to the axis of rotation of the machine. A complete circuit can be made around the slot without meeting a cut in the stator mass.

The closed slots are not open radially toward the outside.

The stator according to the invention does not have attached magnetic wedges.

The stator mass may be produced by stacking magnetic laminations, the slots being produced by cutting the laminations. The closure of the slots on the side of the air gap is obtained by the bridges of material formed in one piece with the rest of the laminations that form the stator mass.

As a variant, the stator mass may be produced at least partially by an additive manufacturing technique, in particular by powder sintering and machining. The stator may have a plurality of stacked slices, each produced by additive manufacturing.

The risk of detachment of wedges for closing the slots is eliminated.

The presence of the closed slots makes it possible to mechanically reinforce the stator and reduce the vibrations.

A minimized notching effect (known as "cogging torque") is obtained.

This stator makes it possible to greatly reduce the electromagnetic disturbances associated with the presence of the slots opening onto the air gap in the prior art.

Because the slots are closed, the risk of impregnation lacquer leaking toward the air gap is eliminated. The stator may be used as a closed impregnation chamber by ensuring sealing at the ends of the stator only. The tooling is thus simplified. This also reduces the amount of lacquer or resin lost and the cleaning operations required.

Bridges of Material

The stator mass may have teeth formed between the slots, which are connected to one another on the side of the air gap by bridges of material. Thus, each slot is closed on the side of the air gap by a bridge of material connecting two consecutive teeth of the stator mass to one another. The bridges of material each connect two adjacent teeth at their base on the side of the air gap and define the bottom of the slot between these teeth.

The bridges of material are in one piece with the adjacent teeth.

The two consecutive teeth are connected on the opposite side by a yoke. The yoke is made in one piece with the teeth. The stator thus does not have a yoke attached to a toothed ring.

As mentioned above, the fact that the slots do not open toward the air gap makes it possible to avoid producing electromagnetic disturbances, in particular an increase in the "magnetic" air gap on account of flux fringing, higher iron losses at the surface of the rotor for the same reason, or pulsating torques. This improves the electromagnetic performance of the machine.

The bridges of material are preferably nondeformable. This increases the stiffness of the stator and improves the lifetime of the electric machine.

The bridges of material may be produced so as to be magnetically saturated during operation of the machine. The passage of the flux from one slot to another is thus limited, without the passage of the flux from the rotor to the stator being prevented.

In order to obtain saturation, it is possible to locally reduce the section of the bridge of material that is available for the passage of the flux, for example by providing at least one localized narrowing formed by at least one groove.

At least some and better still all of the bridges of material may each have at least one region of reduced magnetic permeability that is in one or more of the following forms:

- at least one localized narrowing formed by at least one groove extending along the longitudinal axis of the stator in the thickness of the bridge of material or at least one localized crushing of the material in the width of the bridge of material, and/or
- at least one opening in the width of the bridge of material, and/or
- at least one localized treatment in the width of the bridge of material, which locally reduces the magnetic permeability of the bridge of material.

The region of reduced magnetic permeability formed by the localized narrowing, the localized crushing, the opening or the localized treatment of the bridge of material allows said region of the bridge of material to be magnetically saturated when the machine is in operation, thereby limiting the passage of the flux and increasing the efficiency of the machine.

In addition, the presence of the bridges of material reduces the risk of lacquer being lost in the air gap when the complete stator is being impregnated with a lacquer. This makes it possible to reduce the need for cleaning.

It also makes it possible to reduce the leakage of the lacquer into the air gap during operation of the machine on which the stator is mounted. This simplifies the maintenance of the machine. The term "lacquer" should be understood broadly here, and covers any type of impregnation material, in particular polymer material.

Preferably, the grooves are open toward the slot.

Each region of magnetically reduced magnetic permeability preferentially extends over the entire thickness of the stator mass.

As a variant, the region of reduced magnetic permeability extends over a length less than or equal to the thickness of the stator mass.

The region of reduced magnetic permeability of each bridge of material is preferably continuous in the thickness of the stator mass, and may or may not be rectilinear.

As a variant, the region of reduced magnetic permeability is discontinuous in the thickness of the stator mass.

For example, the stator mass is in the form of a stack of laminations, having teeth that are connected to one another at their base on the side of the air gap by bridges of material, at least some and better still all of the bridges of material of each of the laminations each having at least one region of reduced magnetic permeability. It is possible for the regions of reduced magnetic permeability of the bridges of material of each of the laminations not to be centered.

The bridges of material are in one piece with the teeth.

At least two adjacent laminations may have at least two regions of reduced magnetic permeability that are arranged in a staggered manner relative to one another, and may or may not partially intersect one another. The staggered arrangement may be achieved by turning over certain laminations, in particular every second lamination, of the stack of laminations that form the stator mass or by cutting the laminations at an angle or by using differing laminations.

Grooves

Preferably, in the case in which the bottom of the slots has at least one groove, the grooves are open toward the slots.

The bottom of the slots has at least one bearing surface, better still at least two bearing surfaces, oriented transversely, and the bottom of the groove is set back relative to this or these surfaces. The one or more bearing surfaces may be oriented obliquely relative to the radial axis of the corresponding slot or, preferentially, oriented perpendicular to this axis. The groove forms a break in the slope relative to the one or more bearing surfaces. The electrical conductors, which preferably have a substantially rectangular section, inserted into the corresponding slot preferably bear against the bearing surfaces and are set back relative to the bottom of the groove. Preferably, the electrical conductors are not in contact with the groove. The one or more bearing surfaces are preferentially flat. The bottom of the slot may be flat, with the exception of the groove. This allows good filling of the slots by the electrical conductors in the case of electrical conductors of rectangular transverse section, by allowing the coils to rest flat in the bottom of the slots.

The groove in the bottom of the slot preferably forms a clearance between the bridge of material and the corresponding electrical conductor, and this may make it easier for the lacquer to penetrate when impregnating the stator.

The bridge of material may have at least two grooves as described above, for example two grooves per slot.

The one or more grooves may be centered relative to the one or more slots, or on the contrary offset relative to a plane of symmetry of the one or more slots.

The internal surface of the stator is preferably a cylinder of revolution.

As a variant, the one or more grooves may extend on the internal surface of the stator, i.e. the surface of the stator that defines the air gap with the rotor.

When the one or more grooves are situated on the internal surface of the stator that defines the air gap with the rotor, they may allow angular orientation of the stator, and thus may make stacking the laminations and indexing easier. It is then possible for the stator to have no reliefs on its outer surface, and this may make it possible to improve the contact between the yoke and cooling means.

Preferably, the one or more grooves each have a profile that is curved in section on a plane perpendicular to the axis of the stator, in particular a section that is substantially semicircular.

Localized Crushing

The localized crushing is realized in the thickness of the bridge of material, i.e. along a radial axis of the stator, and constitutes a localized narrowing having reduced magnetic permeability. The crushing preferably forms a groove in the bottom of the slot. In that case, the localized crushing may be as described above for the grooves.

As a variant, the localized crushing is realized in the thickness of the stator, i.e. along an axis parallel to the longitudinal axis of the stator, and has reduced magnetic permeability.

Opening

The aforementioned opening preferentially extends along the longitudinal axis of the stator over the entire thickness of the stator mass.

The opening may have a transverse section that is oval, circular or polygonal, for example with rounded corners, and in particular rectangular.

It is possible for the bridge of material to have only a single opening in its width.

The opening may be at the center of the bridge of material.

The opening may have two thinner regions on either side thereof, the thinner regions being magnetically saturated when the machine is in operation.

As a variant, the bridge of material has a plurality of microperforations in its width. The microperforations reduce the lamination section and allow the bridge of material to be magnetically saturated by a lower magnetic flux.

Treatment

The localized treatment makes it possible locally to modify the permeability of the material of the bridge to the magnetic flux.

The localized treatment may extend over the entire width of the bridge of material or only over a portion thereof.

This treatment may be a heat treatment that locally modifies the orientation of the grains of metal and causes a drop in the magnetic permeability in the circumferential direction.

As a variant, the heat treatment is a thermal stress associated with the degradation of the material during the laser cutting of the bridge of material.

Electrical Conductors

The electrical conductors may be disposed in the slots in a concentrated or distributed manner. "Concentrated" is understood to mean that the electrical conductors are each disposed around a single tooth.

Preferably, the electrical conductors are disposed in the slots in a distributed manner. "Distributed" is understood to mean that the outbound and return electrical conductors are each housed in different and non-consecutive slots. At least one of the electrical conductors can pass successively into two non-adjacent slots.

The electrical conductors may be disposed in the slots in an arranged manner. "Arranged" is understood to mean that the conductors are not disposed in the slots loosely but in an ordered manner. They are stacked in the slots in a nonrandom manner, for example being disposed in one or more rows of aligned electrical conductors.

The electrical conductors may have a transverse section of rectangular overall shape, in particular with rounded corners. The circumferential dimension of an electrical conductor may correspond substantially to the width of a slot. Thus, it is possible for a slot to have only a single electrical conductor in its width. The width of the slot is defined as its circumferential dimension about the axis of rotation of the machine.

As a variant, a slot may have more than one row of electrical conductors. They may be disposed in the slot in one or more rows, for example in a single row, or in two rows, or in three or four rows.

The electrical conductors may be adjacent to one another along their long sides, also called the flat.

Optimizing the stack may make it possible to dispose a greater quantity of electrical conductors in the slots, and therefore to obtain a more powerful stator, with the same volume Each slot may have two to eight electrical conductors, in particular two to four electrical conductors, for example two or four electrical conductors.

The electrical conductors may be in the form of pins. The pin may be U-shaped (known as a "U-pin") or straight, being I-shaped (known as an "I-pin"). They are disposed in the slots in an arranged manner. The electrical conductors may be introduced into the corresponding slots via one or both axial ends of the machine.

An I-shaped electrical conductor passes into a single slot, and is welded at each of its ends to two other electrical conductors, at the axial ends of the stator. A U-shaped electrical conductor passes into two different slots, and is welded at each of its ends to two other electrical conductors, on one and the same axial side of the stator. The bottom of the U is disposed on the other axial side of the stator.

The electrical conductors may be made of copper or aluminum.

Insulation

The electrical conductors are electrically insulated from the outside by an insulating coating, in particular an enamel. The electrical conductors may be separated from the walls of the slot by insulation, in particular by at least one sheet of insulation. Such sheet insulation allows better insulation of the electrical conductors relative to the stator mass.

Each slot may receive at least two electrical conductors, in particular at least two electrical conductors with different phases. These two electrical conductors may be radially superposed. Preferably, the two electrical conductors are separated from one another by insulation, in particular at least one sheet of insulation, better still at least two sheets of insulation, when one sheet is wrapped around each electrical conductor or bundle of electrical conductors associated with a single phase.

Slots

At least one slot, better still all the slots, may have a transverse section of rectangular shape. At least one slot may have mutually parallel opposite radial edges, and better still all the slots have mutually parallel radial edges. The width of a slot is preferably substantially constant over the entire height thereof. A better degree of filling of the slots is thus achieved At least one tooth, better still all the teeth, may have a transverse section of trapezoidal overall shape. At least one tooth, better still all the teeth, may have edges that diverge with increasing distance from the axis of rotation of the machine.

The stator mass may be produced by stacking laminations. The teeth are connected to one another by bridges of material and on the opposite side by a yoke. The closed slots may be produced entirely by cutting the laminations. Each lamination of the stack of laminations may be in one piece.

Each lamination is for example cut from a sheet of magnetic steel or a sheet containing magnetic steel, for example steel 0.1 to 1.5 mm thick. The laminations may be coated with an electrically insulating lacquer on their opposite faces before they are assembled within the stack. The electrical insulation may also be obtained by a heat treatment of the laminations, if appropriate.

As a variant, the stator mass has attached sectors.

The sectors may have teeth connected to one another by bridges of material and on the opposite side by a yoke. The sectors are produced by cutting.

Laminations

A further subject of the invention is a lamination for a stator mass of a stator, in particular the stator as described above, having teeth that are connected to one another at their base on the side of the air gap by bridges of material, at least some and better still all of the bridges of material each having at least one region of reduced magnetic permeability that is in the form of:

at least one localized narrowing formed by at least one groove or a localized crushing, and/or at least one opening in the width of the thickness of the bridge of material, and/or at least one localized treatment in the width of the bridge of material, which locally reduces the magnetic permeability of the bridge of material.

When the stator is formed by stacking laminations as described above, the teeth of the laminations are aligned so as to form the teeth of the stator and the bridges of material of the laminations form the bridges of material of the stator by stacking.

The features described above in relation to the stator apply to the above lamination.

Machine and Rotor

A further subject of the invention is a rotary electric machine, such as a synchronous motor or a synchronous generator, having a stator as defined above. The machine may be synchronous or asynchronous. The machine may be a reluctance machine. It may constitute a synchronous motor.

The rotary electric machine may have a rotor. The rotor may be a wound rotor or a permanent magnet rotor. In the case in which the machine is intended to operate as an alternator, the rotor may be a wound rotor. In the case in which the machine is intended to operate as a motor, the rotor may be a permanent magnet rotor.

The machine may have a relatively large size. The diameter of the rotor may be greater than 50 mm, better still greater than 80 mm, being for example between 80 and 500 mm.

The rotor may have a rotor mass extending along the axis of rotation and disposed around a shaft. The shaft may have torque transmitting means for driving the rotor mass in rotation.

The rotor may be mounted with or without an overhang.

The rotor may be made from a plurality of rotor parts that are aligned in the axial direction, for example three parts. Each of the parts may be offset angularly relative to the adjacent parts (known as "step skew"). The rotor may be twisted.

Manufacturing Method and Machine

A further subject of the invention, independently of or in combination with the above, is a method for manufacturing a stator for a rotary electric machine, in particular a stator as defined above, wherein electrical conductors are disposed in the slots of a stator mass of the stator by introducing them into the corresponding slots via one or both axial ends of the machine.

A single U-shaped electrical conductor may be disposed in two different non-consecutive slots of the stator mass of the stator. In the case in which an electrical conductor is U-shaped, it is welded to two other electrical conductors on one and the same side of the machine.

Two I-shaped electrical conductors previously introduced into two different non-consecutive slots of the stator mass of the stator may be connected to one another. In the case in which an electrical conductor is I-shaped, it is welded to two other electrical conductors on the two opposite sides of the machine.

The stator may be twisted (known as "skewing"). Such twisting in particular makes it possible to tighten the windings in the slots and to reduce the slot harmonics.

BRIEF DESCRIPTION OF THE DRAWINGS

The invention will be better understood on reading the following detailed description of nonlimiting exemplary embodiments thereof, and on studying the appended drawing, in which:

FIGS. 1 to 6 illustrate a stator 2 of a rotary electric machine 1 also having a rotor that is not shown. The stator makes it possible to generate a rotary magnetic field for driving the rotor in rotation, in the context of a synchronous motor, and, in the case of an alternator, the rotation of the rotor induces an electromotive force in the electrical conductors of the stator.

Figure 1:
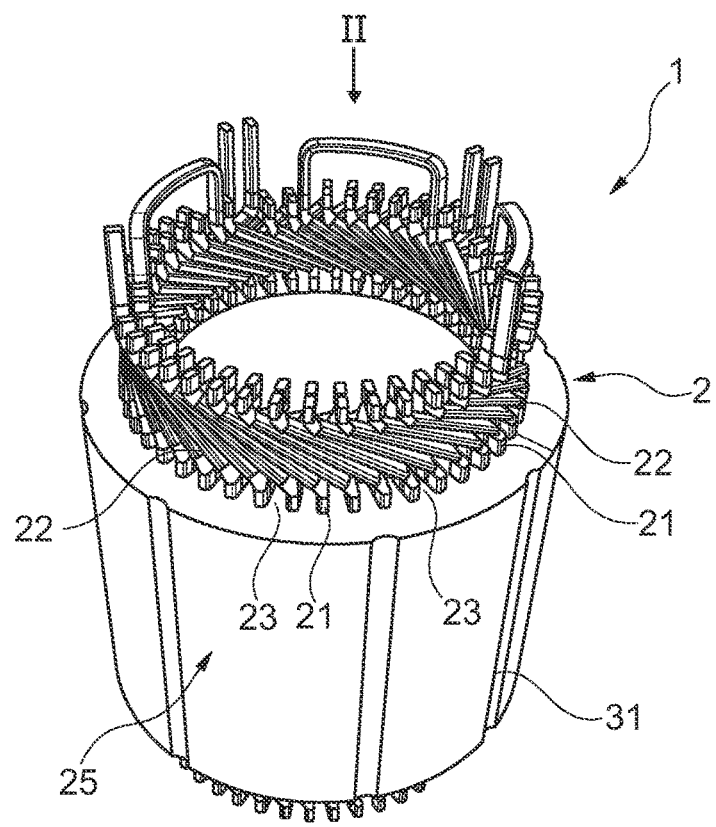
FIG. 1 is a partial and schematic perspective view of a stator produced in accordance with the invention.
Figure 2:
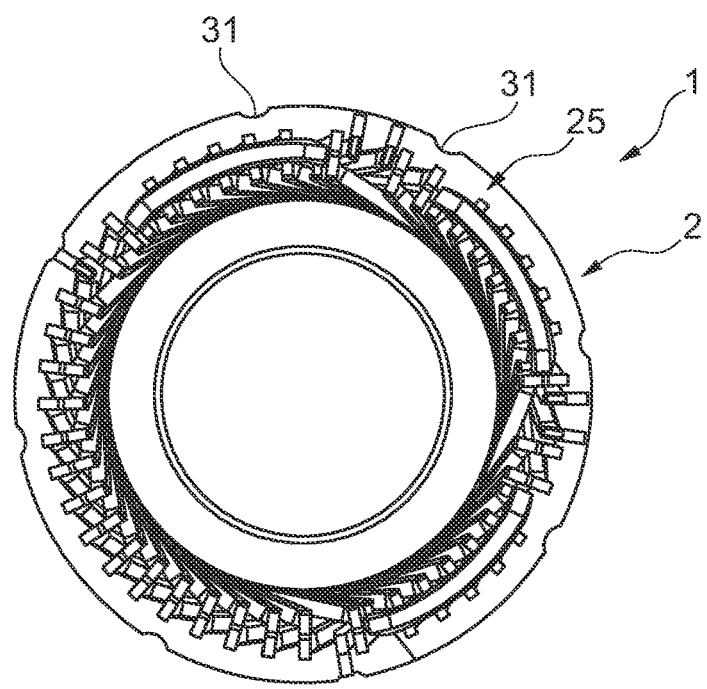
FIG. 2 is a top view thereof, along the arrow II.
Figure 3:
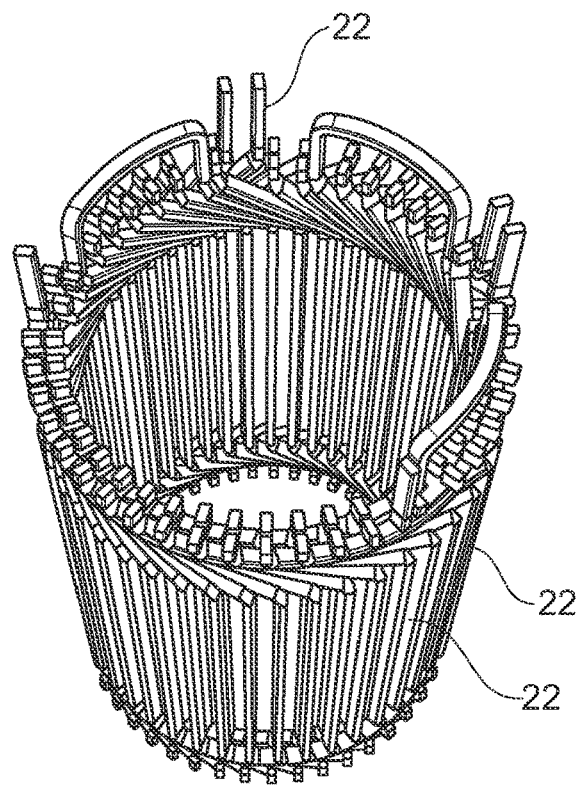
FIG. 3 is a partial and schematic perspective view of the electrical conductors of the stator in FIGS. 1 and 2, considered individually.
Figure 4:
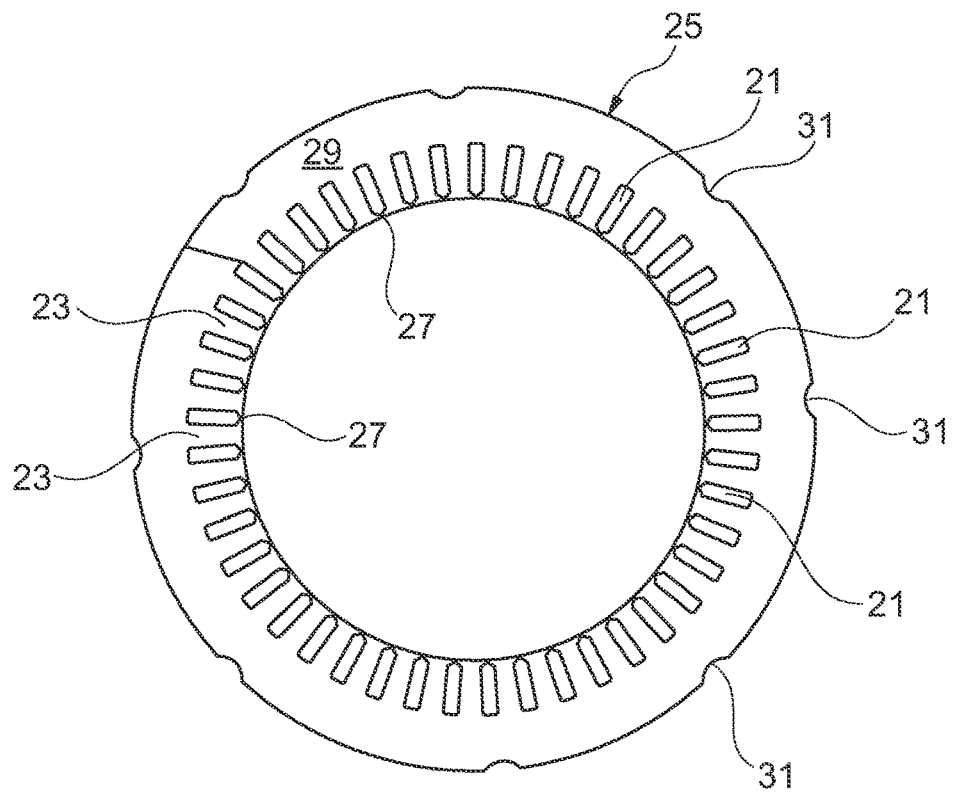
FIG. 4 shows a partial and schematic view in cross section of the stator mass of the stator according to the invention, FIG. 5 partially and schematically shows a portion of the stator mass of the stator in FIG. 1.
Figure 5:
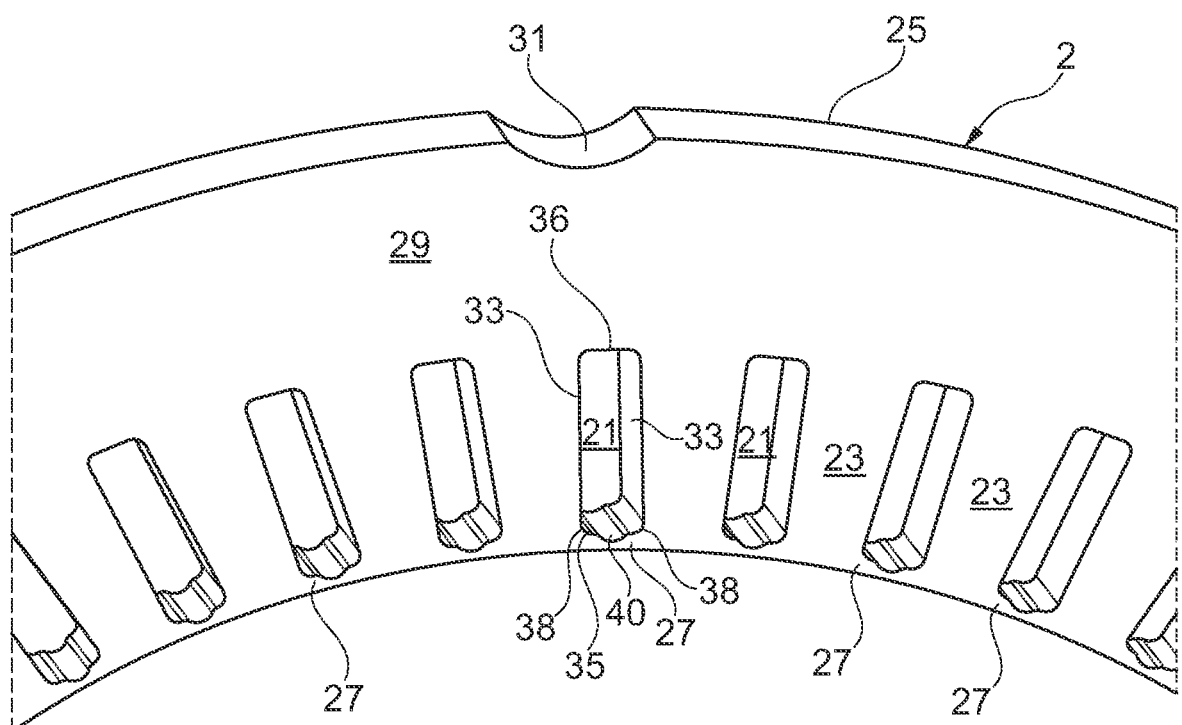

The examples illustrated below are schematic and the relative dimensions of the various constituent elements have not necessarily been respected.

The stator 2 has electrical conductors 22, which are disposed in slots 21 formed between teeth 23 of a stator mass 25. The notches 21 are closed, i.e. a complete circuit can be made around each slot 21 without meeting a cut in the stator mass. The slots 21 are closed on the side of the air gap by bridges of material 27, each connecting two consecutive teeth of the stator mass 25, and on the opposite side by a yoke 29. The latter and the teeth 23 are in one piece. The yoke 29 may be equipped if appropriate with semicircular longitudinal ribs 31 intended to house ducts for the circulation of a cooling liquid.

The electrical conductors 22 are disposed in the slots 21 in a distributed manner. They may be I-shaped or U-shaped.

The electrical conductors 22 are disposed in the slots 21 in an arranged manner, in one or more rows of aligned electrical conductors.

The electrical conductors may have a transverse section of rectangular overall shape, in particular with rounded corners. In the example described, they are radially superposed in a single row. The circumferential dimension of an electrical conductor corresponds substantially to the width of a slot. Thus, the slot has only a single electrical conductor in its width. It may have a plurality of electrical conductors in its radial dimension.

The electrical conductors 22 are made of copper or another conductive material that is enameled or coated with any suitable insulating coating.

Figure 7:
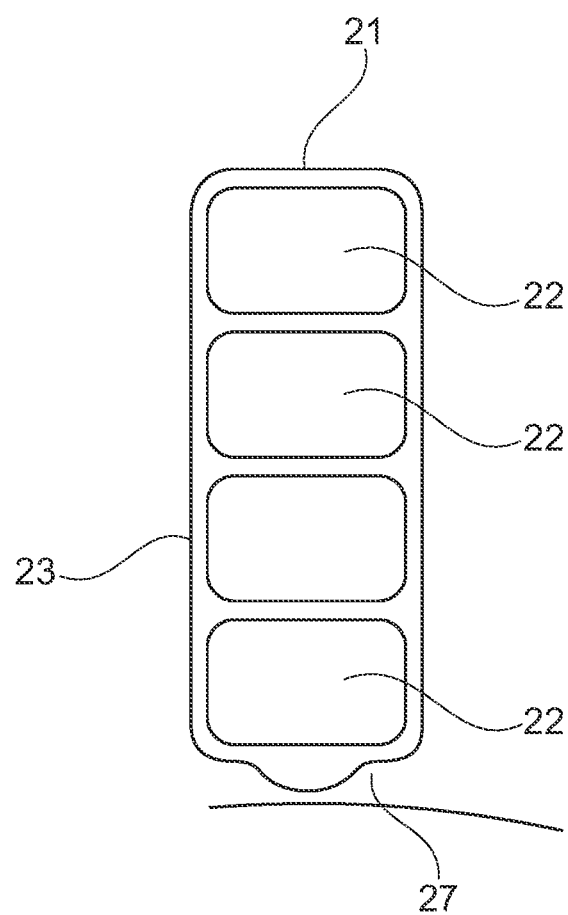
FIG. 7 illustrates a variant embodiment.

In the example described, a slot has at least two electrical conductors with different phases. In the variant embodiment in FIG. 7, a slot has four electrical conductors.

Figure 6:
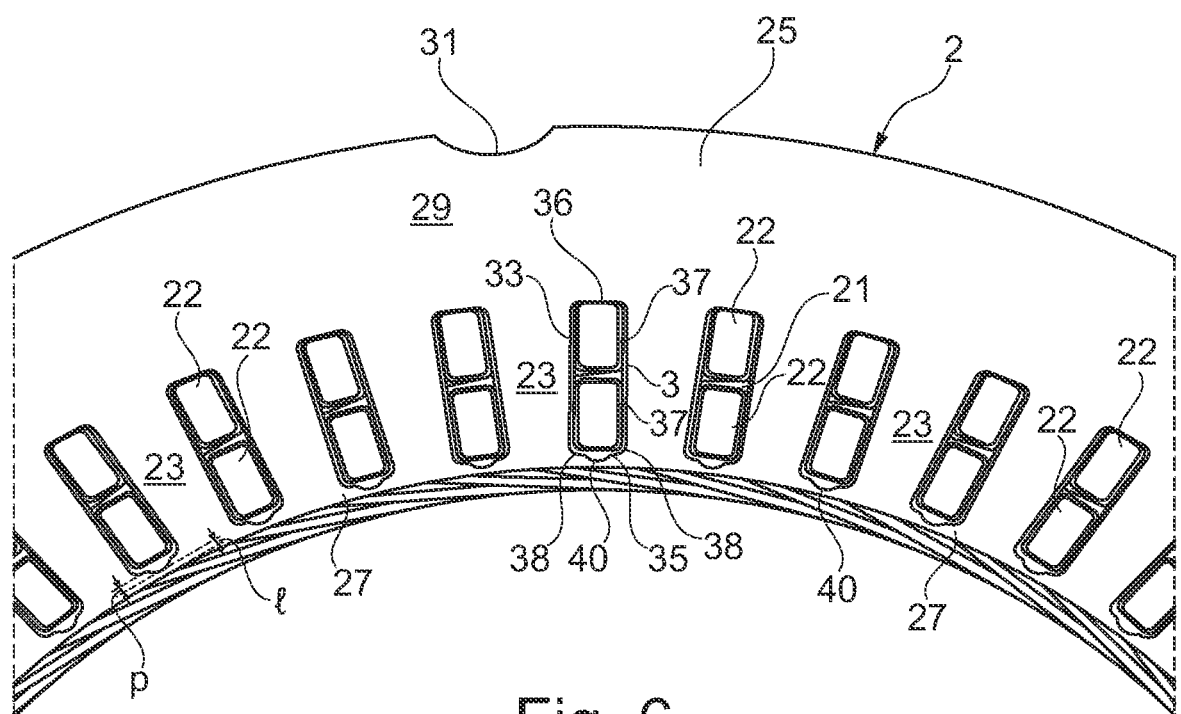
FIG. 6 is a partial and schematic view in cross section of the stator.

Each electrical conductor 22 is surrounded by a sheet 37 of insulation that makes it possible to insulate the electrical conductors from the walls 33 and 36 of the slot and the electrical conductors 22 of different phases, as is visible in FIG. 6.

The slots 21, in the example described, have mutually parallel radial edges 33 and, in section in a plane perpendicular to the axis of rotation X of the machine, are substantially rectangular in shape.

The bottom 35 of the slots 21 has a shape that is substantially complementary to that of the electrical conductors 22, with the exception of a groove or a localized crushing 40. Below, reference will be made only to a groove, but it should be clearly understood that a localized crushing is also possible instead of the groove.

The bottom 35 of the slots 21 is connected to the radial edges 33 by rounded portions 38. The groove 40 of each slot 21 is centered on the bottom of the slot 35 and extends along the axis of rotation X of the machine. In a variant embodiment that is not illustrated, it is possible for the groove not to be centered, or the bottom 35 could have a plurality of grooves.

The grooves 40 have, in section in a plane perpendicular to the axis X, a curved shape that is in particular substantially semicircular. They have a depth p of between 0.2 mm and 1 mm, for example equal to 0.42 mm.

The grooves 40 form a localized narrowing of the bridges of material 27. Such a narrowing allows magnetic saturation of the lamination by a lower magnetic flux along the bridge 27, thereby limiting the passage of the magnetic flux.

The smallest width l of the bridges of material 27 is preferably between 0.3 mm and 0.6 mm, for example equal to 0.4 mm.

The stator mass 25 is formed of a pack of magnetic laminations that are stacked along the axis X, the laminations being, for example, identical and exactly superposed. They may be held together by clipping, by adhesive bonding, by rivets, by tie rods, by welds and/or by any other technique. The magnetic laminations are preferably made of magnetic steel. The teeth 23 of the stator mass 25 may have complementary reliefs on the surface allowing the various laminations that make up the stator mass 25 to be clipped to one another. As a variant, the stator mass may also be formed of one or more sheet-metal strips that are cut out and wound on themselves.

The stator may be obtained by means of a manufacturing method in which the electrical conductors 22 are inserted into the slots 21 via one or both axial ends of the stator, by sliding into the slots 21 along an axis parallel to the longitudinal axis X.

Of course, the invention is not limited to the exemplary embodiments that have just been described, and the rotor associated with the stator described may be a wound rotor or a permanent magnet rotor.

The expression "having a" should be understood to be synonymous with "comprising at least one".

The invention claimed is:

1. A rotary electric machine having a stator and a permanent magnet rotor, the stator having a stator mass that has slots in which electrical conductors introduced axially into the slots are housed, each of the slots having a continuously closed contour,
wherein the stator mass comprises teeth formed between the slots, which are connected to one another on a side of an air gap by bridges of material and on an opposite side by a yoke, the yoke and the teeth being in one piece.

2. The machine of claim 1, wherein the bridges of material comprise at least one localized narrowing formed by at least one groove.

3. The machine of claim 1, wherein the electrical conductors are disposed in the slots in a distributed manner.

4. The machine of claim 1, wherein the electrical conductors comprise a transverse section of a rectangular overall shape.

5. The machine of claim 1, wherein each slot comprises two to eight electrical conductors.

6. The machine of claim 1, wherein at least one slot comprises mutually parallel radial edges.

7. The machine of claim 1, wherein at least one slot comprises a transverse section of rectangular or hexagonal shape.

8. The machine of claim 1, further comprising at least one tooth having a transverse section of trapezoidal overall shape.

9. The machine of claim 1, wherein the stator mass comprises stacked magnetic laminations, with the slots formed in the stator mass by cutting the magnetic laminations of the stator mass.

10. The machine of claim 1, wherein the stator mass is produced at least partially by an additive manufacturing technique.

11. A rotary electric machine having a stator and a permanent magnet rotor, the stator having a stator mass that has slots in which electrical conductors introduced axially into the slots are housed, each of the slots having a continuously closed contour, wherein the electrical conductors comprise pins that are U-shaped or I-shaped.

12. A stator for a rotary electric machine, having a stator mass that has slots in which electrical conductors introduced axially into the slots are housed, each of the slots having a continuously closed contour, wherein the stator mass comprises teeth formed between the slots, which are connected to one another on a side of an air gap by bridges of material and on an opposite side by a yoke, the yoke and the teeth being in one piece, at least one slot having a transverse section of hexagonal shape.

13. The rotary electric machine having a stator as claimed in claim 12 and a rotor.

14. A method for manufacturing a stator for a rotary electric machine, wherein electrical conductors are disposed in the slots of a stator mass of the stator by introducing them into the corresponding slots via one or both axial ends of the machine, wherein either a single U-shaped electrical conductor is disposed in two different non-consecutive slots of the stator mass of the stator, or two I-shaped electrical conductors previously introduced into two different non-consecutive slots of the stator mass of the stator are connected to one another.

* * * * *